(12) United States Patent
Van Oosten

(10) Patent No.: US 9,164,314 B2
(45) Date of Patent: Oct. 20, 2015

(54) ELECTRO-OPTICAL CONTROLLABLE GLAZING

(75) Inventor: Casper Laurens Van Oosten, Utrecht (NL)

(73) Assignee: PEER+ B.V., Eindhoven (NL)

( * ) Notice: Subject to any disclaimer, the term of this patent is extended or adjusted under 35 U.S.C. 154(b) by 141 days.

(21) Appl. No.: 13/809,472

(22) PCT Filed: Jul. 18, 2011

(86) PCT No.: PCT/EP2011/062200
§ 371 (c)(1),
(2), (4) Date: Jan. 10, 2013

(87) PCT Pub. No.: WO2012/010536
PCT Pub. Date: Jan. 26, 2012

(65) Prior Publication Data
US 2013/0107176 A1  May 2, 2013

(30) Foreign Application Priority Data

Jul. 19, 2010 (EP) .................................... 10169957

(51) Int. Cl.
*G02F 1/1335* (2006.01)
*G02F 1/137* (2006.01)
*G02F 1/139* (2006.01)

(52) U.S. Cl.
CPC ...... *G02F 1/133536* (2013.01); *G02F 1/13725* (2013.01); *G02F 1/1393* (2013.01);
(Continued)

(58) Field of Classification Search
CPC ............ G02F 1/133305; G02F 1/1335; G02F 1/133536; G02F 1/133617; G02F 1/1337; G02F 1/13725; G02F 1/13476; G02F 2203/055; G02F 2203/05; G02F 2203/11; E06B 9/24; E06B 2009/2464; B32B 17/10036; B32B 17/10174; B32B 17/10339; G02B 5/208; G02B 5/3016; G02B 5/26; G02B 27/28; Y02B 80/50; B42D 2035/36; B42D 2035/38; B42D 2035/40; B42D 2035/42; C09K 19/02; F24J 2/407

USPC ............... 349/96, 16, 179, 33, 123, 130, 132; 428/1.1, 1.31, 1.3; 252/299.01; 359/609, 296, 485.05, 487.02, 487.06, 359/614
See application file for complete search history.

(56) References Cited

U.S. PATENT DOCUMENTS 5,015,086 A  5/1991  Okaue et al.
6,072,549 A  6/2000  Faris et al.
(Continued)

FOREIGN PATENT DOCUMENTS

CN  101630033 A  1/2010
DE  33 30 305 A1  3/1985
(Continued)

OTHER PUBLICATIONS

Written Opinion of the International Searching Authority issued in Application No. PCT/EP2011/062200; Dated Aug. 24, 2011.
(Continued)

*Primary Examiner* — Thoi Duong
(74) *Attorney, Agent, or Firm* — Oliff PLC

(57) ABSTRACT

A controllable glazing, containing at least a first and a second reflective polarizer and a liquid-crystal-dye layer. The liquid-crystal-dye-layer is arranged between the first and the second reflective polarizer. The alignment of the dichroic dye and the alignment of the liquid crystal of the liquid-crystal-dye-layer are changeable. The first and the second reflective polarizer are denoted for electromagnetic radiation in the wavelength range of $\lambda 1$ to $\lambda 2$ and the liquid-crystal-dye-layer is selected such that the electromagnetic radiation transmission through the controllable glazing is controlled in the wavelength range of $\lambda 3$ to $\lambda 4$ by dye-absorbance and in the wavelength range $\lambda 1$ to $\lambda 2$ by alignment of the liquid crystal and the dye in the liquid-crystal-dye layer. The wavelength range of $\lambda 1$ to $\lambda 2$ is within the wavelength range of 750 nm to 2000 nm and the wavelength range of $\lambda 3$ to $\lambda 4$ is within the wavelength range of 380 nm to 750 nm.

12 Claims, 5 Drawing Sheets

(52) U.S. Cl.
CPC ............... *G02F2001/133541* (2013.01); *G02F 2001/133543* (2013.01); *G02F 2203/05* (2013.01); *G02F 2203/11* (2013.01)

(56) References Cited

U.S. PATENT DOCUMENTS

| | | | |
|---|---|---|---|
| 6,218,501 B1 * | 4/2001 | Choi et al. | 528/170 |
| 6,674,504 B1 * | 1/2004 | Li et al. | 349/169 |
| 7,525,604 B2 * | 4/2009 | Xue | 349/16 |
| 8,665,414 B2 * | 3/2014 | Powers et al. | 349/168 |
| 2002/0118328 A1 | 8/2002 | Faris et al. | |
| 2005/0007506 A1 | 1/2005 | Faris et al. | |
| 2008/0158448 A1 | 7/2008 | Fernando et al. | |

FOREIGN PATENT DOCUMENTS

| | | |
|---|---|---|
| DE | 199 37 768 A1 | 3/2001 |
| JP | 2007-515661 A | 6/2007 |
| WO | WO 99/67681 A1 | 12/1999 |
| WO | WO 00/19252 A1 | 4/2000 |
| WO | 2005/031437 A1 | 4/2005 |

OTHER PUBLICATIONS

International Search Report issued in Application No. PCT/EP2011/062200; Dated Aug. 24, 2011.
Nov. 25, 2014 Office Action issued in Chinese Application No. 201180035040.4.

* cited by examiner

ELECTRO-OPTICAL CONTROLLABLE GLAZING

The invention pertains to a controllable glazing.

BACKGROUND

The transmission spectrum of glazing is important for the energy use of buildings, cars, greenhouses and other indoor spaces. Ideally, the visible light is transmitted in such a way that the correct light level is reached. At the same time, the infrared transmitted is controlled in such a way that the indoor temperature is controlled at the desired temperature. When too little or too much solar radiation is transmitted, much energy is needed for additional heating or cooling of the indoor space. Therefore, one would like to regulate the transmission of radiation through the window.

The most common solution to do this is to provide a non-switchable (static) coating on or in the window. This coating absorbs or reflects part of the incident radiation, thereby limiting the allowed transmission. This coating is typically a static coating and its transmission level cannot be altered. Therefore, the transmission level of the coating is optimised with a 'best average' solution. An additional solar control measure, such as interior or exterior sunshading is required to deal with the high-intensity situations, for example in summertime.

Alternatively, switchable coatings are available. They combine the adjustable transmission of a sunshade in a glazing element. Several technologies are available to construct a switchable coating, including electrochromic, gasochromic, suspended particle devices, polymer dispersed liquid crystals and guest-host dye systems.

Document DE 19937768 describes the use of a LCD for use as a window. The document describes how several components of a traditional liquid crystal displays are removed until one is left with two polarization filters and a homogeneous liquid crystal layer. It is generally understood that a polarization filter for an LCD is a linear absorptive polarization filter, as this is the type of filter that is found in commercial LCD's. The transmission of visible light is controlled using a liquid crystal layer between the two polarizing filters. In DE 3330305 a window system that combines two linear polarizers with a guest-host type dye system is described. The transmission ratio in this case can be tuned by means of the concentration of the dye or the thickness of the switchable layer. In both previous cases, the maximum theoretical transmittance in this case is 50%, as the polarizers maximally allow 50% of the light to pass. In practice this number is even lower due to imperfectness of the polarization filters (a maximum practical value of 35% is reported in U.S. Pat. No. 5,015,086). In many cases, <50% transmittance is too low transmittance of visible light for practical applications. Therefore, using absorptive linear polarizers is not attractive to solve this problem.

WO 99/67681 uses an approach where high light transmittance is available while still allowing (electrical) switching to lower light transmission. This is achieved by using a dichroic dye in a liquid crystal guest. By varying the concentration of the dye, the transmissive range can be tuned anywhere between virtually 100% and 0%. The downside of this approach is that the available dichroic dyes are mostly active in the visible range of the spectrum. Only a limited number of dyes is available that allow blocking of the light for a small part of the IR (infra red) spectrum (750 nm-3000 nm). Therefore, this set-up is not adequate to block the IR electromagnetic radiation.

US 2005/007506 and US 2002/0118328 describe an alternative method to provide radiation control using cholesteric liquid crystals. Following this description, the transmission level can be controlled to be 0%, 50% or 100% for a certain wavelength regime using cholesteric liquid crystal layers. In this case >50% transmission can only be achieved by switching the cholesteric layer itself. This is difficult to do in practice, especially if one would like to have a broad regime for reflection.

Document US 2008/0158448 discloses a system, in which on top and on the bottom polarizer are arranged. Between the polarizer a liquid crystal layer is sandwiched. The liquid crystal layer functions as a polarization retarding or rotating layer. The system is explicitly designed such that light transmission in the visible range (380-780 nm) is controllable [003]. In addition to this, the system in US 2008/0158448 is designed that external stimulus applied to the active layer to achieve transmittance change in the visible spectrum will have little or no effects on the filtering of UV and infrared by the light control layer. In contradiction to this, one of the benefits of the present invention is to have a switchable transmission in the visible range and in the IR range, wherein the visible light transmisison can be tuned to be more than 50% in the high-transmissive state. This cannot be achieved with polarizer based systems described in document US 2008/0158448.

Document U.S. Pat. No. 6,072,549 discloses a system for controlling light incident on a smart window. In one embodiment described in this document a liquid crystal is used. The liquid crystal is responsible for scattering the light isotropically in all directions (without applying a voltage) and to ray the light through the layer without deviation of scattering (with applying a voltage). A liquid crystal guest host system is not disclosed in document U.S. Pat. No. 6,072,549.

SUMMARY

Aim of the invention is to provide a glazing that allows controlled transmission of electromagnetic radiation of different wavelength ranges.

This aim is being achieved by a controllable glazing with the features of claim 1. The controllable glazing comprises a guest-host liquid crystal system with dichroic dyes (liquid-crystal-dye-layer), sandwiched between two reflective polarizers preferably based on Bragg reflection. Reflective polarizers reflect one polarization state of the electromagnetic radiation, whereas the other polarization direction is transmitted.

None of the prior art documents discloses a combination of a system that switches as a function of retardation and due to dichroic dyes, affecting two different wavelength ranges. The use of reflective polarizers in combination with dichroic dyes is also not disclosed in the prior art.

Therefore, the present invention provides a controllable glazing, which controls two different wavelength ranges.

Preferably, the alignment of the liquid-crystal-dye-layer controls the transmission in wavelength range $\lambda 3$-$\lambda 4$ and in wavelength range $\lambda 1$-$\lambda 2$ simultaneously.

DETAILED DESCRIPTION OF EMBODIMENTS

In the following description the term "electromagnetic radiation" is used, whereby the term preferably describes light radiation. If the term "light" is used it should be clear that this means electromagnetic radiation.

The controllable glazing with the features according to claim 1 allows precise control over the transmitted radiation.

The controllable glazing allows switching of the visible transmittance in a wavelength range of $\lambda 3$-$\lambda 4$ from >50% transmission in the bright state to a darker state, while switching IR transmittance in wavelength range of $\lambda 1$-$\lambda 2$ to less than 20% in the dark state. Additionally, it is possible to independently switch the visible transmittance and the IR transmittance wavelength ranges.

The first and/or the second polarizer can be a reflective linear polarizer or a reflective circular polarizer. The first and/or the second polarizers may be on the outside of the controllable glazing or as an intermediate layer, as long as the switchable liquid-crystal-dye-layer is in between the first and the second reflective polarizers. The first and/or the second reflective polarizer prefearbly is/are based on Bragg reflection. Bragg reflection occurs when light travels through a medium that has a periodic change of the refractive index, wherein the periodicity of the index change (a length) is in the order of the wavelength of the electromagnetic radiation. A polarization selective Bragg reflector can be created when the index change occurs only in one direction in the plane. One way to achieve this is to use a cholesteric liquid crystal polymer. The index variation through the cholesteric layer causes Bragg reflection of one circular polarization state of the light (right- or left handed) and therefore acts as a reflective polarizer (right-handed-circular-polarized-light (RHCPL) for righthanded, LHCPL for lefthanded). The wavelength range (or wavelength regime) in which the polarizer is active depends on the cholesteric pitch and the refractive index and birefringence of the cholesteric liquid crystal polymer and will be denoted with $A1$-$\lambda 2$. The cholesteric circular polarizer can have variations in helical pitch through the thickness, to increase the width of the reflection band. The maximum transmission of the cholesteric polarizer can be tuned by varying the thickness of the polarizer. A cholesteric layer that has less than approximately 10 full rotations of the helix at the same pitch length, will reflect less than 50% of the electromagnetic radiation. Alternatively, layers with opposite handedness can be mixed in to decrease the reflectivity. The cholesteric polarizers can be made from a homogeneous layer of liquid crystal polymer. Alternatively, the cholesteric polarizer can be made from cholesteric flakes embedded in a polymer coating. Rather than a circular reflective polarizer, a linear reflective polarizer can be used. One embodiment of a reflective linear polarizer is a 3M DBEF (Dual Brightness Enhancement Film). This film has a refractive index modulation through the thickness of the film for only one in-plane direction. Alternatively, a linear reflective polarizer can be constructed using a cholesteric reflective polarizer in combination with a ¼ lambda (A) waveplate. The benefit of cholesteric liquid crystal polymer reflectors is that they can simply be tuned for their reflective wavelength by adjusting the cholesteric pitch. The reflection band is limited by the birefringence of the liquid crystal and is therefore typically 100 nm (depending on the central wavelength and the birefringence), but the reflection band can be broadened by adding multiple layers or by creating a gradient in the pitch.

In a preferred embodiment the alignment of the liquid crystal and the dye in the liquid-crystal-dye-layer control the polarization state of electromagnetic radiation in the wavelength range of $\lambda 1$-$\lambda 2$ travelling through the liquid-crystal-dye-layer.

It is further preferred, that the first and second reflective polarizer polarize the electromagnetic radiation in the wavelength range $\lambda 1$-$\lambda 2$.

In a preferred embodiment the reflective polarizer is a cholesteric liquid crystal polymer.

The dye in the liquid-crystal-dye-layer is a dichroic dye, more preferred a fluorescent dye. It is further preferred that the alignment of the liquid crystal and the alignment of the dye in the liquid-crystal-dye-layer are changeable by applying an electrical voltage on the controllable glazing. In a preferred embodiment such an electrical field is applied on the liquid-crystal-dye-layer due to two transparent conductors that are present on the top and/or the bottom substrate.

The liquid-crystal-dye-layer (LC+dye layer) preferably has dyes that absorb electromagnetic radiation in the wavelength range of $\lambda 3$-$\lambda 4$. Furthermore, the liquid-crystal-dye-layer acts as a switchable waveplate for the regime $\lambda 1$-$\lambda 2$ due to the birefringence and the alignment (orientation) of the material. When the dye and the liquid crystal in the LC+dye layer is arranged so that the LC+dye layer acts a half-wave retardation, a maximum (theoretically 100%) of electromagnetic radiation in wavelength range $\lambda 1$-$\lambda 2$ is reflected in the following way:

(assuming RHCPL reflection): From the incoming light, the right handed circular polarization component is reflected at the first polarizer for wavelengths $\lambda 1$-$\lambda 2$. This is maximally 50% of the light in this range, wavelengths outside this range are transmitted.

The transmitted light has a left handed circular polarization. This light is retarded by the liquid-crystal-dye-layer by a half wavelength, which changes the polarization state of the light to right handed circular light.

This right handed circular polarized light within regime $\lambda 1$-$\lambda 2$ is reflected by the second cholesteric layer. Upon travelling back through the waveplate, the light is again converted to left handed circular polarized light and exits the system.

When the waveplate (i.e. the arrangement of the liquid crystal and the dye in the LC+dye layer) is set to zero retardation, the lefthanded component of the electromagnetic radiation within range $\lambda 1$-$\lambda 2$ will be transmitted through the system. This means that the transmission through the controllable glazing is high. Additional, non-switchable (static), retardation layers may be used to improve switching contrast or to minimize angular dependence. If a liquid crystal polymer retardation layer is used, a combination of in-plane and homeotropic alignment is preferred.

In an alternative embodiment the top- and bottom circular polarizers for $\lambda 1$-$\lambda 2$ have opposite handedness, minimum transmission for wavelength range $\lambda 1$-$\lambda 2$ is achieved when the waveplate (created by the arrangement of the liquid crystal and the dye in the liquid-crystal-dye-layer) has no retardation and maximum transmission when the waveplate (created by the arrangement of the liquid crystal and the dye in the liquid-crystal-dye-layer) is switched to a half wavelength retardation. Alternative combinations of (reflective) polarizer orientations, switchable and static waveplates are possible.

At the same time, the electromagnetic radiation in wavelength interval $\lambda 3$-$\lambda 4$ interacts with the dichroic dye. A dichroic dye has a high absorption along one axis of the molecule, whereas it has low absorption along another axis, whereby the ratio between the high-absorption value and low absorption value is larger than 1.5. By switching the dye from having its absorption axis perpendicular to the propagation direction of the light (high absorption) to being parallel to the propagation direction of the dye (low absorption) the absorption in the regime $\lambda 3$-$\lambda 4$ can be controlled.

The alignment of the liquid-crystal-dye-layer is preferably controlled with an alignment control layer located on either side of the liquid-crystal-dye-layer. The alignment control layer is preferably directly in contact with the top and/or the bottom of the liquid-crystal-dye-layer. Preferably, the alignment control layer is a double layer of containing a polyimide layer on an electrode or a single photoresponsive command surface. The polyimide layer can be a buffed, rubbed, or non-buffed or non-rubbed polyimide layer. In case the alignment control layer is a double layer of polyimide on an electrode, the polyimide layer is a thin layer with a thickness between 20 nm and 400 nm, more preferably between 30 nm and 300 nm and most preferably between 50 nm and 200 nm. More preferably, two double layers of polyimide on electrodes as alignment control layers are used, whereby each double layer is stacked such that the polyimide layer of the double layer structure is located closest to the switchable layer. In a preferable embodiment the electrodes exhibit transparent properties. Preferably the two electrodes can be located on either top and bottom side of the switchable layer, or as in-plane patterned electrodes on one side of the switchable layer, whereby a voltage can be applied to the optical device by means of the electrodes.

In case the alignment control layer is a photoresponsive command surface, the alignment of the luminescent material is controlled by the intensities of light of certain wavelength(s) irradiated upon a command surface of the optical device.

Preferably, the command surface is controlled by light irradiation between 200 nm and 1000 nm, more preferably between 300 nm and 450 nm. The photoresponsive command surface is a thin layer and can be a self-assembled-monolayer up to a thickness of 50 nm, more preferably up to a thickness of 150 nm and most preferably up to a thickness of 200 nm. The alignment layer preferably uses a photochromic compound that can be an azobenzene, stilbene, cinnamate, α-Hydrazono-β-ketoester, spiropyran, benzylidenephtalimidene or a benzylideneacetophenone.

The alignment of the liquid-crystal-dye-layer refers to the average molecular orientation of the molecules of the layer. Common molecular orientations, are the uniaxial planar organization, twisted nematic (TN), supertwisted nematic (STN) splayed or cholesteric. In the TN or STN mode, the dye molecules are oriented parallel to the substrate, where the molecular director makes a rotation of approximately 90 for TN or 270 degrees for STN over the cell thickness. In the homeotropic alignment, the dye molecules are oriented perpendicular to the substrate. In the planar uniaxial mode, the dye molecules are oriented parallel to the substrate with the dye molecular director pointing in one direction. A large number of methods are available to control and alter the dye molecular alignment between the states. Most important and used in practice are surface alignments techniques and electrical fields. Changing the alignment of the liquid crystal by applying an electrical voltage simultaneously changes the retardation and alignment of the dichroic dye. This has effect on the reflection in the wavelength range $\lambda1$-$\lambda2$ (due to retardation) and absorption in wavelength range $\lambda3$-$\lambda4$. The setup in this manner allows control over both wavelength intervals. An anti-reflection layer active in wavelength range $\lambda3$-$\lambda4$ may be added to the system on the outside of the sandwich.

The wavelength range of $\lambda1$ to $\lambda2$ is within the wavelength range of 750 nm to 2000 nm.

The wavelength range of $\lambda3$ to $\lambda4$ is within the wavelength range of 380 nm to 750 nm.

Preferably the wavelength ranges of $\lambda1$ to $\lambda2$ and $\lambda3$ to $\lambda4$ do not completely overlap ($\lambda1<\lambda3$ and $\lambda2<\lambda4$, or $\lambda1>\lambda3$ and $\lambda2>\lambda4$).

Preferably the transmission of electromagnetic radiation in the wavelength range of $\lambda1$-$\lambda2$ is in the range of 0% to 50%.

It is further preferred that the transmission of the electromagnetic radiation in the wavelength range of $\lambda3$-$\lambda4$ is of 5% to 80%.

Preferably the minimum level of transmission for wavelength interval $\lambda3$-$\lambda4$ is 50% for the highest transmitting state. The minimum level of reflection over wavelength interval $\lambda1$-$\lambda2$ is 40% for the highest transmitting state.

The controllable glazing is preferably used as glass in vehicles or buildings, like houses or greenhouses.

The present invention is further described in the following, with reference to the accompanying drawings and examples.

BRIEF DESCRIPTION OF THE DRAWINGS

In FIG. 1 the transmittance T in % depending on the wavelength for the controllable glazing is shown. The controllable glazing shows an absorptive part A and a reflective part R, whereby the transmission is mostly reduced by dye absorption for electromagnetic radiation in the wavelength range of $\lambda3$ to $\lambda4$ and whereby the transmission is mostly reduced by reflection of electromagnetic radiation in the wavelength range of $\mu1$ to $\lambda2$.

FIG. 2 shows an embodiment of the controllable glazing 8. The controllable glazing 8 exhibits a first polarizer 1, a second polarizer 2, a liquid-crystal-dye-layer 3, two alignment control layers 4, and two substrate layers 5. The alignment control layer 4 is built up as double layer 4. Preferably both layers of the alignment control layer 4 are transparent conductors and/or polymer alignment layers, such as polyimide or polyvinylalcohol.

Figure 3:
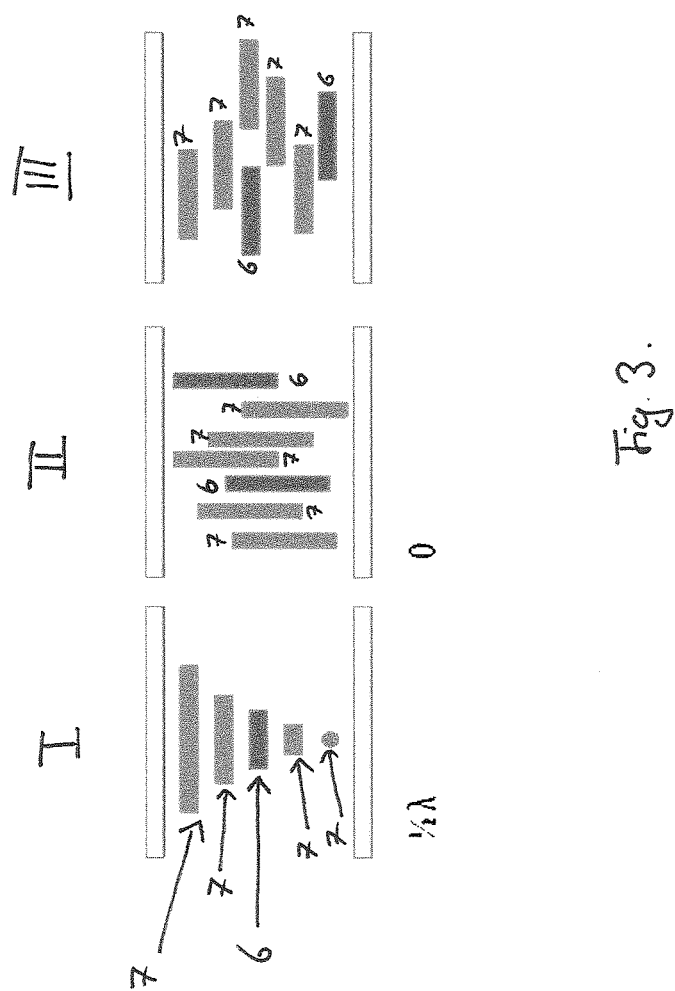
FIG. 3 schematically shows a molecular alignment of a liquid-crystal-dye-layer in TN, homeotropic and planar uniaxial alignment.

The scheme of FIG. 3 shows possible liquid-crystal-dye-layer 3 organizations. A liquid crystal 7 in the liquid-crystal-dye-layer 3 has the function of a guest-host system and controls the molecular orientation of the dichroic dye 6.

Figure 4:
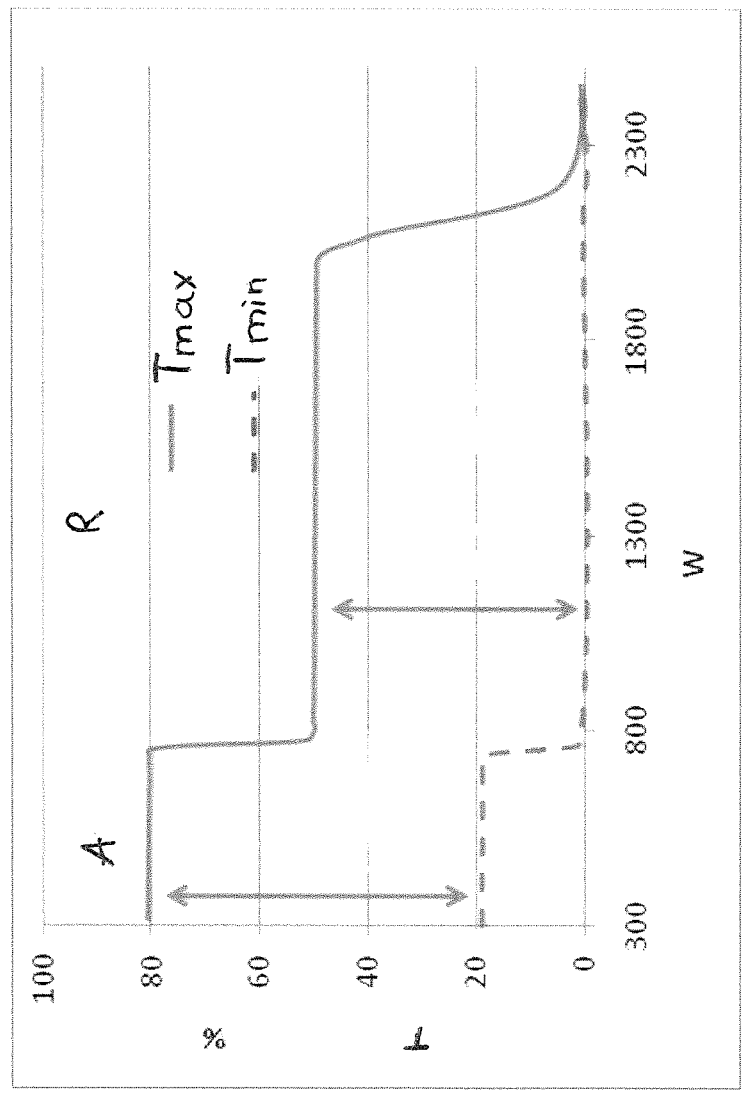
FIG. 4 schematically shows a maximum and a minimum transmission of a controllable glazing.

In FIG. 4 the transmittance T in % depending on the wavelength for the controllable glazing 8 is shown, whereby the line T max describes the maximum transmittive state of the controllable glazing 8 and the line T min describes the minimum transmittive state for the configuration in the following example 1.

Figure 5:
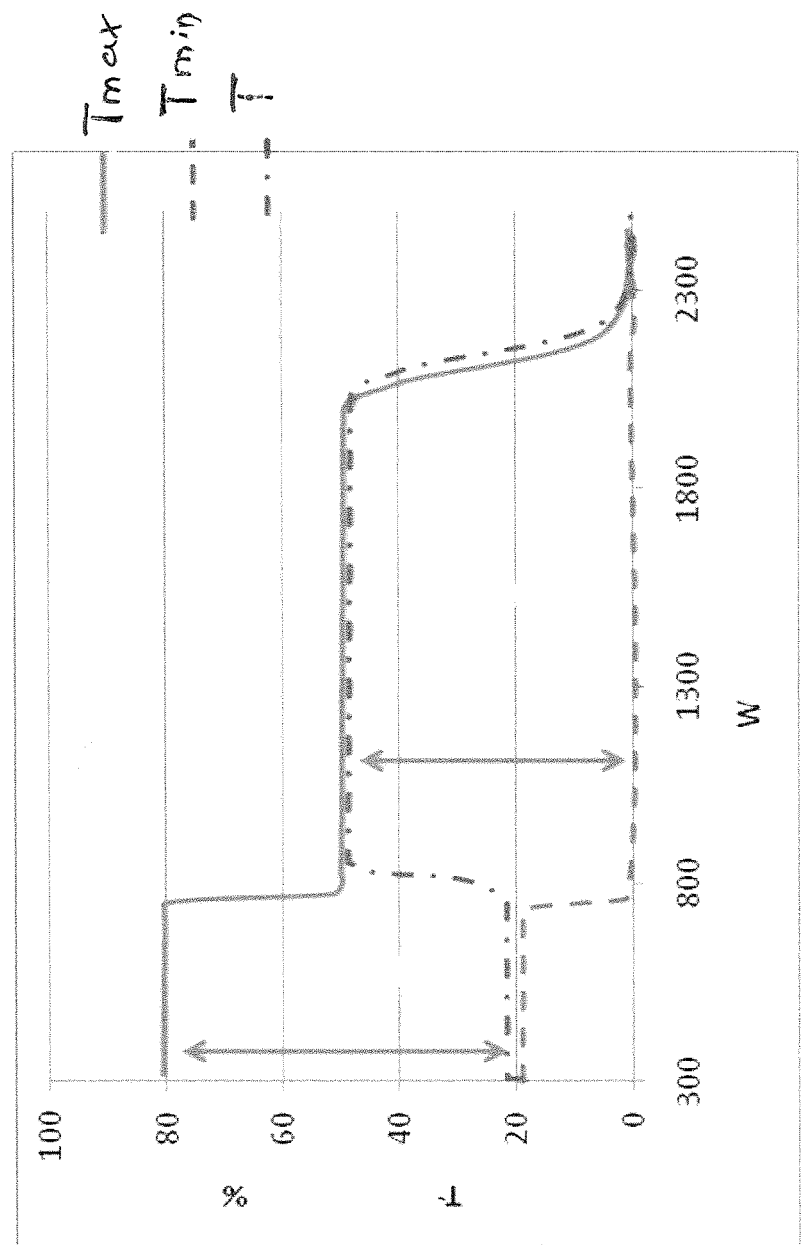
FIG. 5 schematically shows three transmissive states for a controllable glazing.

FIG. 5 shows the transmittance T in % depending on the wavelength for the controllable glazing 8 for the configuration in the following example 2, whereby the line T max describes the maximum transmittive state of the controllable glazing 8 and the line T min describes minimum transmittive state and the line T describes a transmissive state wherein the visible light transmittance is minimized and the IR light transmittance is maximized for visual comfort and warmth, achieved when a voltage is applied across the interdigitated electrodes.

EXAMPLES

Example 1

Figure 1:
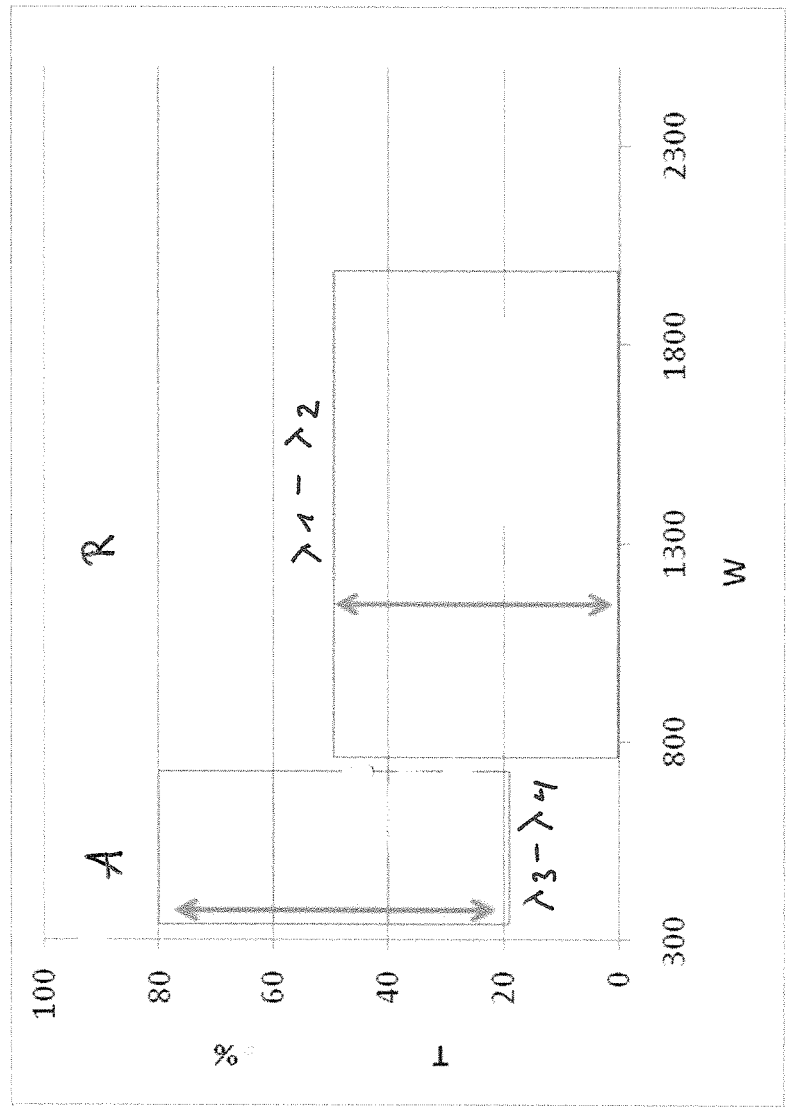
FIG. 1 schematically shows an example of switching ranges.
Figure 2:
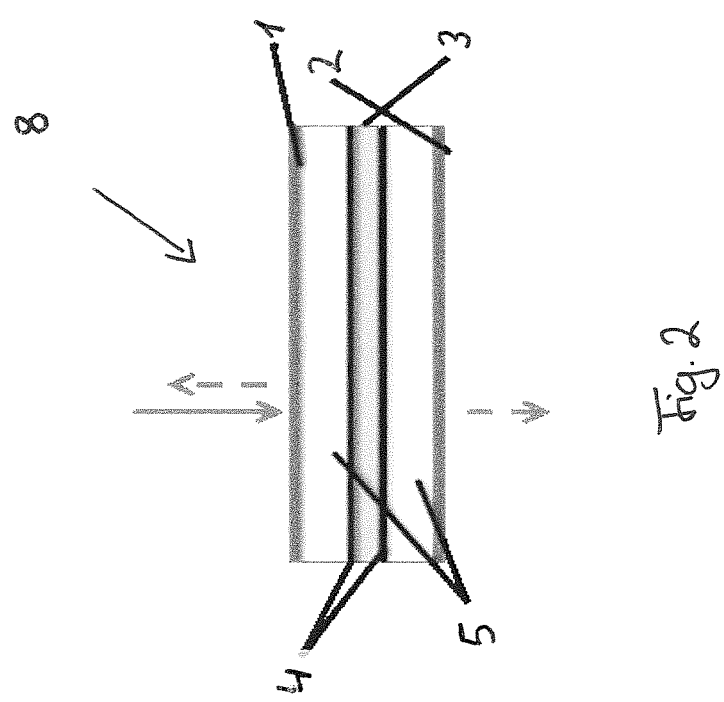
FIG. 2 schematically shows an embodiment of the controllable glazing.

The setup in this example follows the device configuration for the controllable glazing of FIG. 2 and is:
Cholesteric LC polymer layers (top and bottom) with same handedness, reflecting RHCPL over the range 780-2000 nm
A liquid-crystal-dye-layer containing a mixture of dichroic dyes based on azobenzene and anthraquinone families of dyes, with absorption axis along length of molecule, absorbing in wavelength range 350-780 nm, dissolved in the liquid crystal host such E7 from Merck. The layer thickness of the liquid-crystal-layer is 10 μm. The top and bottom alignment layers are treated such that the molecular configuration in the off-state (no voltage applied) is a twisted nematic alignment. Also the alignment layers contain a transparent conductor the allows the application of an electrical field over the liquid-crystal-dye-layer. When no field is applied, the molecular configuration is a twisted nematic configuration. By applying a AC voltage (100 Hz, 10 V), the alignment switches from TN (twisted nematic) to homeotropic. The transmittance for the two states is listed below and shown in the following table 1:

TABLE 1

| Configuration 1 | Alignment TN or STN | Alignment Homeotropic |
|---|---|---|
| $T_{IR}(\lambda_1-\lambda_2)$ | 0% | 50% |
| $T_{vis}(\lambda_3-\lambda_4)$ | 20% | 80% |

In this way, the objective of a high visible transmittance in the bright state is achieved, while in the dark state there is only a low IR transmittance.

Example 2

The setup in this example describes a controllable glazing like the controllable glazing of FIG. 2:
  Cholesteric LC polymer layers (top and bottom) with same handedness;
  Dichroic dye with absorption axis along length of molecule;
  One of the substrates has two electrodes in an interdigitated ('finger') pattern to allow in-plane switching, the second substrate has a homogeneous conductive layer (three electrodes for the system).

This device can be switched with an electrical field from TN to planar alignment using the in-plane electrodes on the first substrate. When a voltage is applied over the two substrates, a homeotropic alignment is obtained. The transmittance for the three states is listed in Table 2.

TABLE 2

|  | Alignment TN or STN | Alignment Homeotropic | Alignment: Planar |
|---|---|---|---|
| $T_{IR}(\lambda_1-\lambda_2)$ | 0% | 50% | 50% |
| $T_{vis}(\lambda_3-\lambda_4)$ | 20% | 80% | 20% |

In this way, three states of transmittance can be achieved and the IR transmittance is independently controlled with respect to the visible transmittance.

REFERENCE NUMBERS

1 first reflective polarizer
2 second reflective polarizer
3 liquid-crystal-dye-layer
4 alignment control layer
5 substrate
6 dichroic dye
7 liquid crystal
8 controllable glazing
A absorptive part
R reflective part I Schematic representation of the twisted nematic alignment of the liquid-crystal-dye-layer, yielding a ½lambda waveplate for electromagnetic radiation traveling perpendicular through the layer
II Schematic representation of the homeotropic alignment of the liquid-crystal-dye-layer, not affecting the polarization state for electromagnetic radiation travelling perpendicular through the layer
III Schematic representation of the planar uniaxial alignment, whereby the retardation is strongly wavelength dependent for electromagnetic radiation traveling perpendicular through the layer
$T_{max}$ maximal transmissive state
$T_{min}$ minimal transmissive state
T transmissive state wherein the visible light transmittance is minimized and the IR light transmittance is maximized for visual comfort and warmth

The invention claimed is:

1. Controllable glazing, comprising at least a first and a second reflective polarizer and a liquid-crystal-dye-layer, wherein the liquid-crystal-dye-layer comprises a dichroic dye and a liquid crystal and the liquid-crystal-dye-layer is arranged between the first and the second reflective polarizer, wherein the alignment of the dichroic dye and the liquid crystal of the liquid-crystal-dye-layer is changeable, wherein the first and the second reflective polarizer polarize electromagnetic radiation substantially only in the wavelength range of λ1 to λ2 and wherein the liquid-crystal-dye-layer is selected such that transmission of electromagnetic radiation through the controllable glazing is controlled in the wavelength range of λ3 to λ4 by dye-absorbance and in the wavelength range λ1 to λ2 by alignment of the liquid crystal and the dye in the liquid-crystal-dye-layer, and a minimum level of transmittance in the wavelength range of λ3 to λ4 is 50% for a highest transmission state, and wherein the wavelength range of λ1 to λ2 is within the wavelength range of 750 nm to 2000 nm and the wavelength range of λ3 to λ4 is within the wavelength range of 380 nm to 750 nm.

2. Controllable glazing according to claim 1, wherein the alignment of the liquid-crystal-dye-layer simultaneously controls the transmission in wavelength range λ3 to λ4 and in wavelength range λ1 to λ2.

3. Controllable glazing according to claim 1, wherein the alignment of the liquid crystal and the dye controls the polarization state of electromagnetic radiation in the wavelength range λ1 to λ2 travelling through the liquid-crystal-dye-layer.

4. Controllable glazing according to claim 1, wherein the first and the second reflective polarizer are linear or circular polarization selective Bragg reflectors.

5. Controllable glazing according to claim 1, wherein the first and/or the second reflective polarizer is a cholesteric liquid crystal polymer.

6. Controllable glazing according to claim 1, wherein the dye in the liquid-crystal-dye-layer is a fluorescent dye.

7. Controllable glazing according to claim 1, wherein the alignment of the liquid crystal and the dye in the liquid-crystal-dye-layer are changeable by applying an electrical voltage on the controllable glazing.

8. Controllable glazing according to claim 1, wherein the transmission of the controllable glazing in the wavelength range of λ1 to λ2 is within the range of 0% to 50%.

9. Controllable glazing according to claim 1, wherein the transmission of the controllable glazing in the wavelength range of λ3 to λ4 is within the range of 5% to 80%.

10. Controllable glazing according to claim 1, wherein the controllable glazing further comprises an alignment control layer located on each side of the liquid-crystal-dye-layer.

11. Controllable glazing according to claim 10, wherein the alignment control layer comprises a polyimide layer on an electrode.

12. Controllable glazing according to claim 10, wherein the alignment control layer comprises a photoresponsive command surface.

* * * * *